United States Patent
Durand et al.

(10) Patent No.: US 9,376,200 B2
(45) Date of Patent: Jun. 28, 2016

(54) FRONT AIRCRAFT SEALED BOTTOM COMPRISING RECESSES FOR HOUSING COCKPIT EQUIPMENT

(71) Applicant: Airbus Operations (SAS), Toulouse (FR)

(72) Inventors: Yves Durand, Aussonne (FR); Bernard Guerring, Montrabe (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 93 days.

(21) Appl. No.: 14/108,718

(22) Filed: Dec. 17, 2013

(65) Prior Publication Data

US 2014/0203143 A1    Jul. 24, 2014

(30) Foreign Application Priority Data

Dec. 17, 2012   (FR) ....................................... 1262144

(51) Int. Cl.
| | | |
|---|---|---|
| *B64C 1/10* | (2006.01) | |
| *B64C 1/36* | (2006.01) | |
| *B64C 13/04* | (2006.01) | |
| *B64D 11/06* | (2006.01) | |

(52) U.S. Cl.
CPC ... *B64C 1/10* (2013.01); *B64C 1/36* (2013.01); *B64C 13/04* (2013.01); *B64D 11/06* (2013.01)

(58) Field of Classification Search
CPC ............ B64C 1/10; B64C 1/36; B64C 13/04; B64D 11/06
USPC ....................................................... 244/121
See application file for complete search history.

(56) References Cited

U.S. PATENT DOCUMENTS

| | | | |
|---|---|---|---|
| 6,213,428 B1 * | 4/2001 | Chaumel ................. | B64C 1/068 244/102 R |
| 7,784,736 B2 | 8/2010 | Guering et al. | |
| 2006/0022088 A1 * | 2/2006 | Dazet ........................ | B64C 1/06 244/121 |
| 2007/0164152 A1 | 7/2007 | Anderson et al. | |
| 2008/0149769 A1 | 6/2008 | Koch et al. | |
| 2008/0210813 A1 * | 9/2008 | Guering .................... | B64C 1/10 244/102 R |
| 2010/0012781 A1 * | 1/2010 | Cazals ..................... | B64C 1/068 244/119 |
| 2010/0059626 A1 * | 3/2010 | Cazals .................. | B64C 1/0009 244/119 |
| 2010/0176241 A1 * | 7/2010 | Meyer ....................... | B64C 1/36 244/119 |
| 2013/0082138 A1 * | 4/2013 | Guering ................. | B64D 13/00 244/117 R |
| 2013/0146710 A1 * | 6/2013 | Bernadet ................. | B64D 45/00 244/119 |
| 2014/0159949 A1 * | 6/2014 | Mialhe ................... | H01Q 1/281 342/26 B |
| 2014/0175223 A1 * | 6/2014 | Durand ................... | B64C 1/068 244/119 |

(Continued)

FOREIGN PATENT DOCUMENTS

FR       2910875       8/2010

OTHER PUBLICATIONS

French Search Report, Sep. 2, 2013.

*Primary Examiner* — Christopher P Ellis
*Assistant Examiner* — Jessica Wong
(74) *Attorney, Agent, or Firm* — Greer, Burns & Crain, Ltd.

(57) ABSTRACT

A leaktight nose cone backplate for an aircraft having a first side oriented towards a radome zone intended to house a mobile antenna, and a second side opposite the first side and oriented towards a cockpit of the aircraft. The second side has at least one recess intended to receive at least one piece of cockpit equipment, each recess being partly delimited by a backplate structure forming a protrusion on the first side.

12 Claims, 8 Drawing Sheets

(56) References Cited

U.S. PATENT DOCUMENTS

2014/0175224 A1* 6/2014 Durand .................... B64C 1/00 244/120

2014/0175225 A1* 6/2014 Durand .................... B64C 1/18 244/120

2014/0246542 A1* 9/2014 Guering .................... B64C 1/14 244/102 A

* cited by examiner

FRONT AIRCRAFT SEALED BOTTOM COMPRISING RECESSES FOR HOUSING COCKPIT EQUIPMENT

CROSS-REFERENCES TO RELATED APPLICATIONS

This application claims the benefit of the French patent application No. 12 62144 filed on Dec. 17, 2012, the entire disclosures of which are incorporated herein by way of reference.

TECHNICAL FIELD

This invention relates to a forward part of an aircraft, also called a nose cone. The invention is applicable to all types of aircraft, particularly aircraft with an integrated windshield, in which the windshield fits into the aerodynamic profile of the cockpit.

BACKGROUND OF THE INVENTION

Many developments have been made to the nose cone of aircraft to optimize its mass, volume, cost, safety, ease of manufacturing, maintenance, etc. For example, such a nose cone is known as disclosed in documents FR 2 910 875 and U.S. Pat. No. 7,784,736.

The forward part of an aircraft forms a complex environment inside which elements are very compact so that they occupy the smallest possible volume. This environment includes the leaktight nose backplate, one of the functions of which is to form a structural element capable of resisting impacts, and particularly bird strikes. This leaktight backplate creates a barrier between the aft pressurized zone and the forward non-pressurized radome zone. Many developments have been made on the leaktight backplate itself to satisfy mass and dimensional constraints. For example, these developments have led to the use of a leaktight backplate with a globally V-shaped section open towards the forward direction, for a nose cone with an integrated windshield.

Nevertheless, there is still a need to reduce the global size of the aircraft nose cone even further.

SUMMARY OF THE INVENTION

Therefore, the purpose of the invention is to at least partially overcome the disadvantage mentioned above that occurs with embodiments according to prior art.

To achieve this, the purpose of the invention is principally a leaktight nose cone backplate for an aircraft having a first side oriented towards a radome zone in which a mobile antenna will be housed, and a second side opposite the first side and oriented towards a cockpit of the aircraft, characterized in that said second side has at least one recess inside which at least one piece of cockpit equipment will be located, each recess being partly delimited by a backplate structure forming a protrusion on said first side.

The invention is remarkable in that it makes it possible to house one or several pieces of cockpit equipment in the recess(es) in the leaktight nose backplate. The consequence of these recesses is to create protrusions in parts of the radome zone that are not scanned by the mobile antenna. In other words, the invention proposes to use these parts of the radome zone that have not yet been used, inside which equipment can be housed.

Thus, equipment placed in recesses specific to this invention are moved forward from the position that they occupy with a leaktight backplate with a conventional design, without changing the position of this leaktight backplate within the nose cone. Consequently, at least some of the other pieces of cockpit equipment can be moved forward, with the consequence of reducing the total length of the forward part. With the invention, the bulkhead between the cockpit and the aft part, called the cabin part for commercial aircraft, may be moved forward. This has the advantage of reducing the total length of the aircraft and consequently reducing the mass and/or increasing the length of the cabin part, with the consequence of making the aircraft more cost effective.

Preferably, the leaktight backplate comprises a skin and a plurality of stiffeners fitted on said skin at the second side. Furthermore, said recess is at least partly formed in the height of the stiffeners. For example, this may be possible by interrupting one or several stiffeners, the recess then being at least partly formed in the cutout/hollowed out part of the stiffeners.

In this case, it is preferably arranged such that the recess has a lateral structure from which a plurality of said stiffeners extend, outside the recess.

Preferably, said backplate structure has additional stiffeners at said first side. These additional stiffeners can thus compensate for the reduction in the mechanical strength observed at the interrupted stiffeners on the second side of the leaktight backplate. The protrusion formed on the first side is then at least partly made by these additional stiffeners. In this case, it is a so-called "inverted mesh" construction, due to the local positioning of additional stiffeners on the side opposite the side on which the main stiffeners are located.

Preferably, said additional stiffeners are located on a skin of said leaktight backplate, said additional stiffeners preferably being the only stiffeners fitted on the skin at the first side.

According to one preferred embodiment of the invention, said backplate structure defines a bottom surface with a leaktight backplate skin. In this configuration, the depth of the recess then corresponds to the height of the interrupted stiffeners.

According to a second preferred embodiment of the invention, the backplate has a gap inside which a module is housed at least partly forming said backplate structure of the recess. This gives a recess that can be deeper than that delimited by the leaktight backplate skin in the first embodiment. This depth may also be variable depending on the space available in the radome zone. Furthermore, these gaps may advantageously act as access doors for operators during manufacturing of the forward part, and/or maintenance operation after the module has been removed.

Preferably as mentioned above, said module defines a back surface at least partly offset from a leaktight backplate skin, and facing said first side. This means that cockpit equipment can be shifted even further forwards, for a maximum saving in terms of reducing the mass and/or increasing the cabin length.

Preferably, said module houses said cockpit equipment to facilitate assembly. The module may also include other elements such as cladding, isothermal protection, etc.

Preferably, said cockpit equipment is a manual or electronic rudder bar system. Conventionally, a rudder bar system refers to a flight control by which the pilot or co-pilot acts on the steering control surfaces and can rotate the aircraft about its yaw axis. The rudder bar usually comprises pedals actuated with both feet. Nevertheless, it may refer to any other cockpit equipment located close to the leaktight nose backplate, without going outside the scope of the invention.

Preferably, the leaktight backplate has two recesses facing the two cockpit seats, particularly when the equipment to be housed consists of rudder bar systems.

Another purpose of the invention is a method of manufacturing an aircraft leaktight nose backplate as described above, at least part of said cockpit equipment being assembled on said module before said module is inserted in said gap. As mentioned above, this facilitates the leaktight backplate manufacturing process, because the module is automatically assembled by assembling the module in its gap.

Another purpose of the invention is a forward part of an aircraft comprising a leaktight nose cone backplate as described above, the first side of which is covered by a protective shield, preferably also having a protrusion superposed on the protrusion defined by the backplate structure of the recess. In this case again, the zones of the radome part not scanned by the radar are advantageously used for placement of protrusions of the protective shield for even better optimisation of the overall dimensions of the forward part.

Preferably, said leaktight backplate has a globally V-shaped section open forwards, the ends of which are preferably fixed to the fuselage of the forward part, and the tip oriented in the aft direction is fixed to a forward end of a cockpit deck. The global V-shape open in the forward direction promotes the existence of unused extensive parts in the radome zone close to the leaktight nose backplate. Consequently, the recesses may be deep, and cockpit equipment pushed even further forwards by being housed in these recesses in the leaktight backplate.

It is stated that said mobile antenna is preferably mounted on the leaktight backplate, for example using a mast centered on this leaktight backplate. In this case, being articulated at its center so that it can pivot about the transverse and vertical axes with given amplitudes, the antenna leaves spaces on each side of it that were hitherto unused, and of which the invention proposes to take advantage to create local cockpit extensions inside which equipment can be housed.

Finally, another purpose of the invention is an aircraft comprising a forward part of the type defined above.

Other advantages and characteristics of the invention will become clear after reading the non-limitative detailed description given below.

BRIEF DESCRIPTION OF THE DRAWINGS

This description will be made with reference to the appended drawings among which.

DETAILED DESCRIPTION OF THE PREFERRED EMBODIMENTS

Figure 1:
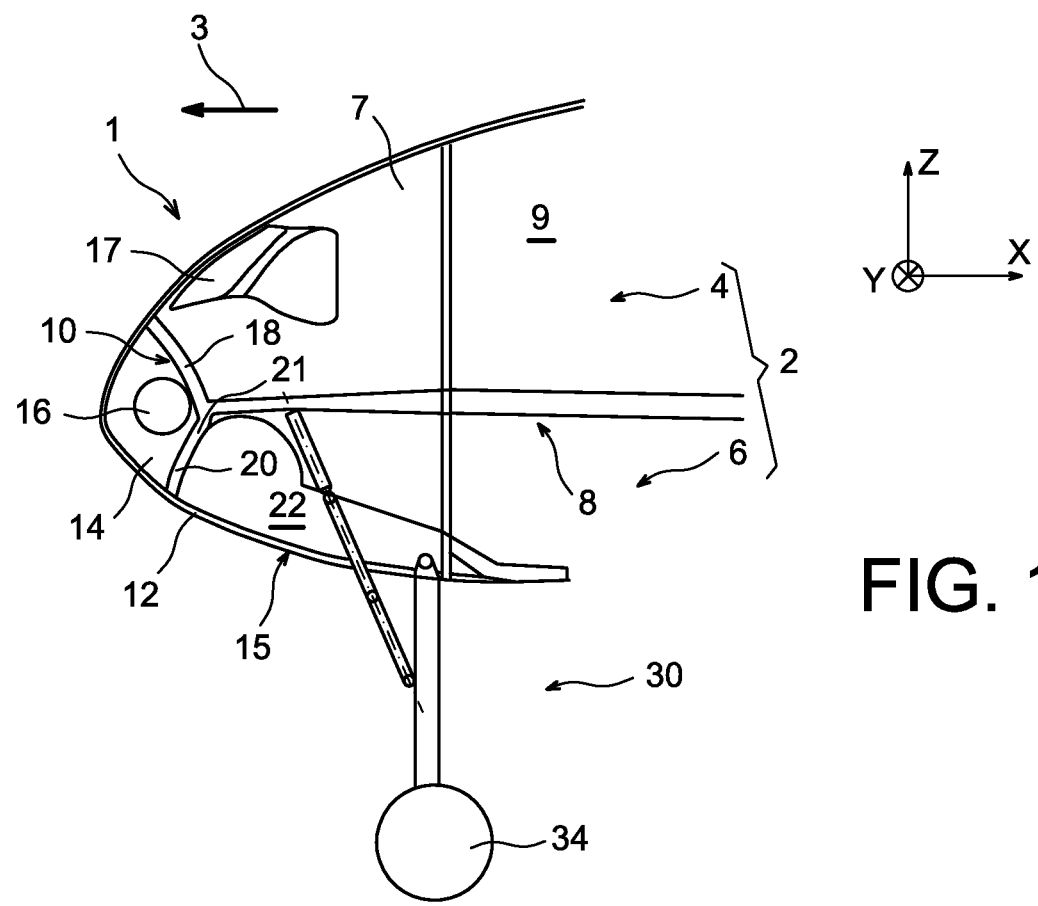
FIG. 1 shows a diagrammatic side view of a forward part of an aircraft inside which a leaktight backplate according to this invention will be located.

FIG. 1 shows a forward part of an aircraft 1 referred to as a nose cone that will contain a leaktight backplate according to this invention.

Throughout the remaining description, by convention, X is the longitudinal direction of the aircraft, Y is the direction transverse to the aircraft, and Z is the vertical direction or the height, these three directions X, Y and Z being orthogonal to each other.

Furthermore, the terms "forward" and "aft" should be considered relative to a direction of movement of the aircraft that occurs as a result of the thrust applied by the jets, this direction being diagrammatically shown by the arrow 3.

The forward part 1 comprises firstly, in its aft part, a pressurized zone 2 inside which there is a separation deck 8 between an upper pressurized compartment 4 usually set aside for transport of persons and called the "cabin" zone, and a pressurized underfloor compartment 6 normally set aside for the storage of technical equipment specific to the aircraft and/or storage of the cargo. More precisely, the upper pressurized compartment 4 usually comprises, working from the forward end to the aft end, the cockpit 7 of the aircraft followed by the passenger cabin 9. Furthermore, the pressurized underfloor compartment 6 usually comprises, working from the forward end to the aft end, a zone called the service hold inside which engineering equipment specific to the aircraft will be located, followed by a so-called cargo compartment zone for storage of the cargo.

The pressurized zone 2 is delimited at the forward end by a leaktight nose backplate 10 that, with the nose cone 12 of the fuselage 15, defines a non-pressurized radome zone 14 that houses a mobile antenna 16 shown diagrammatically. The leaktight backplate 10 is in the global sectional shape of a V open forwards, the ends of which are fixed to the fuselage 15, and the tip of which faces in the aft direction and is fixed to the forward end of the deck 8, or close to it. The upper part 18 of the leaktight backplate 10 delimits the cockpit in the forward direction, and may have a slight forwards curvature so that it can be fixed under the windshield 17. Its lower part forms firstly a forward bulkhead 20 of a non-pressurized landing gear well 22, and secondly a panel 21 delimiting the underfloor pressurized compartment 6 that travels partly above the landing gear well 22.

In this case, the nose landing gear well is designed to house a nose landing gear 30 in its retracted state, different from the extended state shown diagrammatically in FIG. 1. In the retracted state, the wheel 34 is supposed to be as close as possible to the forward bulkhead 20 of the leaktight backplate.

Figure 2:
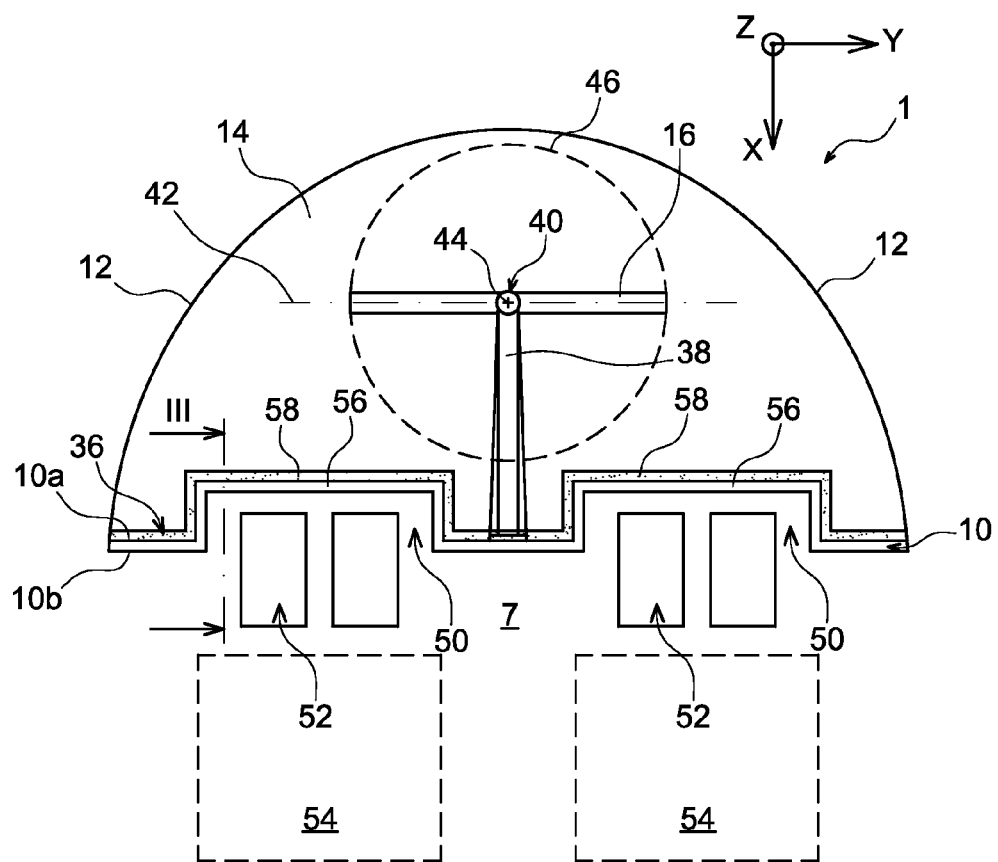
FIG. 2 shows a diagrammatic top view of the forward part of an aircraft with the leaktight backplate shaped according to the principle of the invention.
Figure 3:
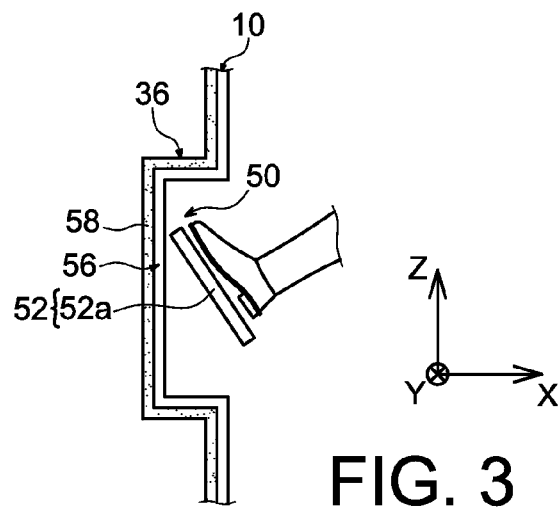
FIG. 3 shows a diagrammatic sectional view taken along line III-III in FIG. 2.

With reference now to FIGS. 2 and 3, the figures show the leaktight backplate 10 according to the principle of the invention. The backplate 10 has a first side 10a oriented towards the radome zone 14, and a second side 10b opposite the first side, oriented towards the cockpit 7. The first side 10a is largely or entirely covered by a protective shield 36 which is designed to reinforce the leaktight backplate structure to mitigate the so-called "bird strike" risk. Therefore the shield 36 is comprised of structurally reinforcing the leaktight nose cone backplate and protecting it by a relatively thick element that increases its thickness. This element is usually formed from a thick sandwich panel, for example of the order of 100 mm. It consists of absorbing the shock by redistributing energy over a sufficiently large area, such that the leaktight backplate that supports it is not expected to resist a peak load exceeding its resistance capacity.

The leaktight backplate 10 supports the antenna 16 through a mast 38, a forward end of which supports an antenna articulation device 40, and the aft end of which is mounted fixed on the first side 10a of the backplate and/or on the protective shield. In this case, the mast is mounted centered on the leaktight backplate 10 along the direction of the transverse axis Y. Similarly, the antenna 16 is mounted centered on the articulation device 40 in the center of the radome zone 14, so that it can pivot about the transverse axis 42 and the vertical axis 44 with given amplitudes. Normally, the rotation amplitude about the vertical axis 44 is of the order of +90° to −90° relative to a reference position in which the antenna 16, usually circular in periphery and preferably approximately plane, is located in a transverse plane YZ as shown diagrammatically in FIG. 2. Furthermore, the rotation amplitude about the transverse axis 42 defined by the articulation device 40 is on the order of +45° to −45° relative to the reference position. Thus, the antenna 16 may be materialised by a sphere 46 reflecting its movement.

As can be seen in FIG. 2, there are hitherto unused spaces on each side of the antenna 16 in the radome zone 14. One of the special features of the invention is that it uses these spaces to create local cockpit extensions inside which equipment can be housed.

To achieve this, the second side 10b of the backplate 10 has at least one recess 50 inside which at least one piece of cockpit equipment will be housed, in this case a rudder bar system 52. In the configuration shown in FIG. 2, two recesses 50 are provided facing the two cockpit seats 54, namely the pilot's seat and the co-pilot's seat.

Each recess 50 is partly delimited by a backplate structure 56 forming a protrusion on the first side 10b in the radome zone. Therefore these protrusions 56 partly occupy the unused spaces in the zone 14 together with the portions of the protective shield 36 covering these protrusions and themselves forming protrusions 58 in the radome zone 14. Therefore the protrusions 56, 58 are superposed along the longitudinal X direction, and project on each side of the mast 38 of the leaktight backplate 10 in the non-pressurized radome zone 14. These protrusions can partly be located in line with the radar sphere 46, along the longitudinal direction X.

FIG. 3 shows a pedal 52a of the rudder bar system 52 that can move into at least one control position in which it is partially inserted into the recess 50. This demonstrates the forward location of rudder bar systems 52 relative to their usual position in the cockpit, this forward position making it possible to move many other pieces of cockpit equipment forwards, thus contributing to reducing the length of the cockpit.

FIGS. 5 to 9 represent a first preferred embodiment of the invention.

The leaktight backplate 10 has a skin 60 that extends over the entire surface of this backplate, and therefore has a generally V shape open towards the front. At the second side, the skin is fitted with stiffeners, including the stiffeners 62 extending along the direction of the height, and stiffeners 64 extending along the transverse direction. Vertical stiffeners 62 travel upwards on the skin 60, being added directly onto the skin by bolting, welding or any other technique deemed to be appropriate. Preferably, low height transverse stiffeners 64 are interrupted by the passage of the vertical stiffeners 62, and are preferably integral with the skin 60.

Figure 4:
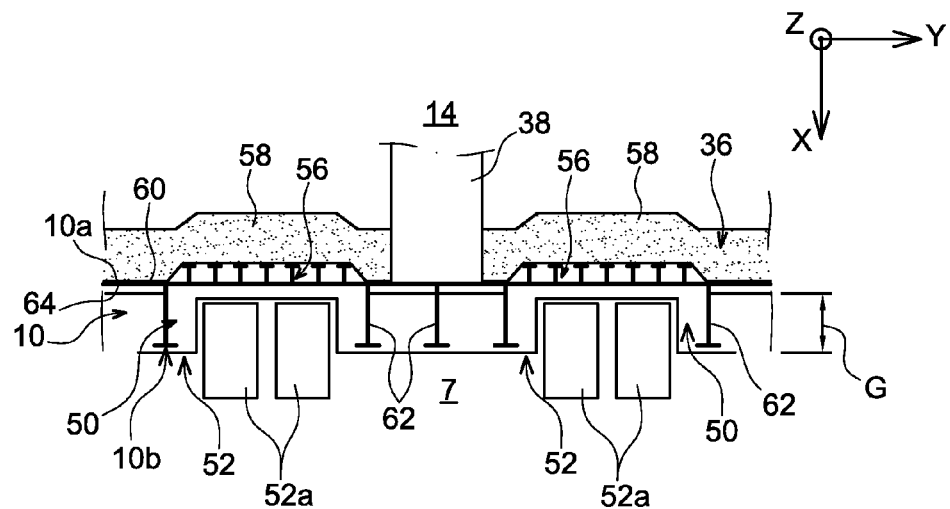
FIG. 4 shows a view similar to the view in FIG. 2, with the leaktight backplate in the form of a first preferred embodiment according to the invention.
Figure 5:
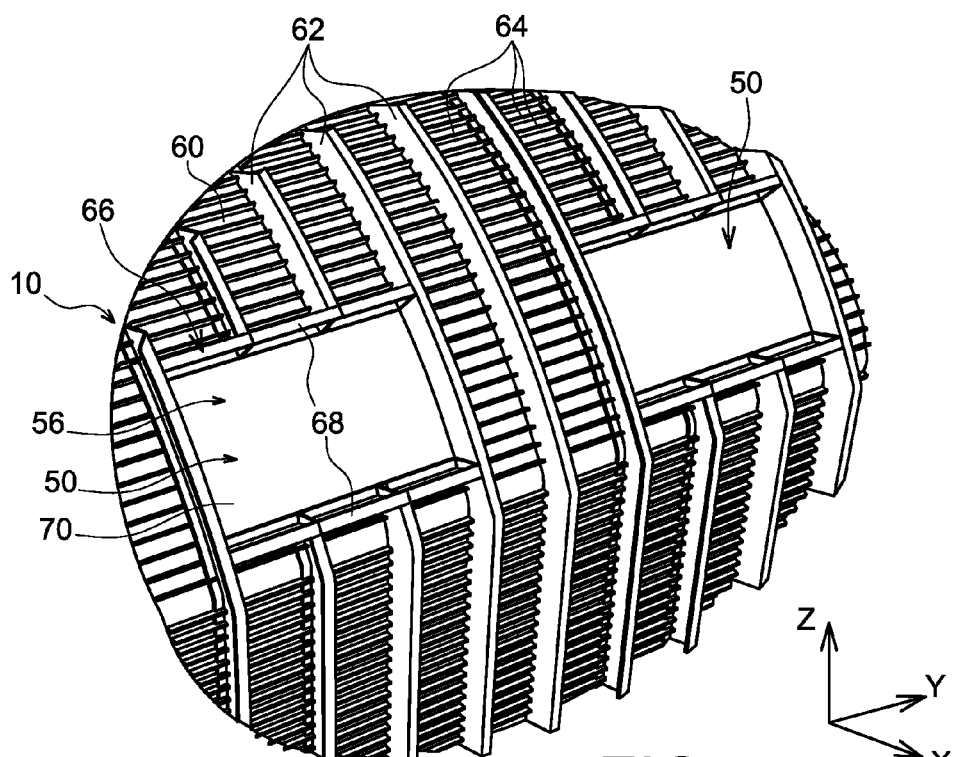
FIGS. 5 to 7 show perspective views of the leaktight backplate shown in FIG. 4, at different view angles.
Figure 6:
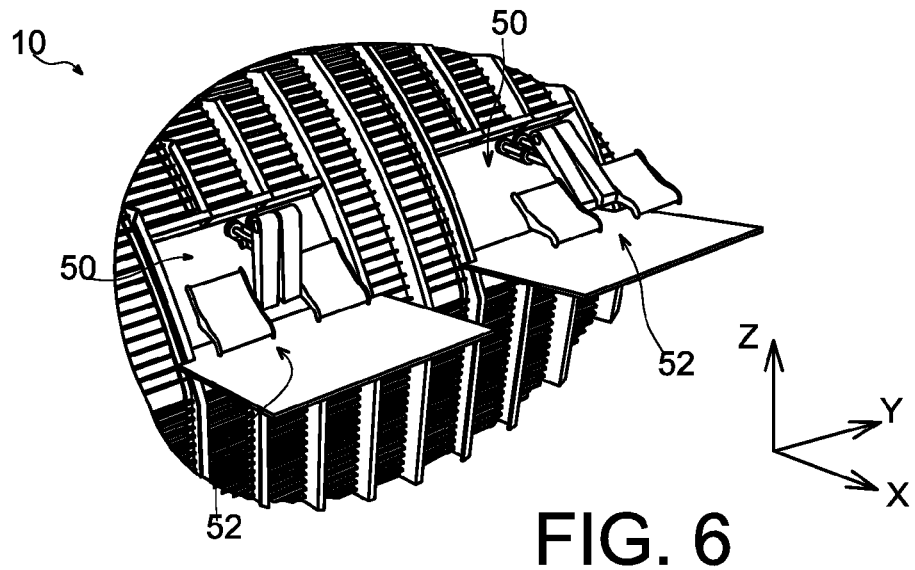

In this first preferred embodiment, each recess 50 is formed at least partly in the height of the vertical stiffeners 62. To achieve this, one or several of these stiffeners 62 are interrupted, for example two among them being directly consecutive, as shown in FIG. 5. Each recess 50 is then defined by a lateral structure 66 and the backplate structure 56. The lateral structure for example has two opposite segments of stiffeners 62, connected to each other by two transverse spars 68 from which interrupted stiffeners 62 extend external to the recess. The spars 68 are in contact with the skin 60 like the stiffeners 62 and they have exactly the same height as the stiffeners 62, this height then corresponding to the depth of the recess 50. The bottom surface 70 of this recess is defined by the skin 60 that forms an integral part of the above-mentioned backplate structure 56. In this case, note that the skin 60 is free of any transverse stiffeners 64 in each approximately square or rectangular shaped recess 50. This increases the recess depth so that the rudder bar systems 52 shown in FIG. 6 can be brought well forwards from the previously occupied position behind the stiffeners 62, the space saving being shown schematically by the dimension "G" in FIG. 4.

Figure 7:
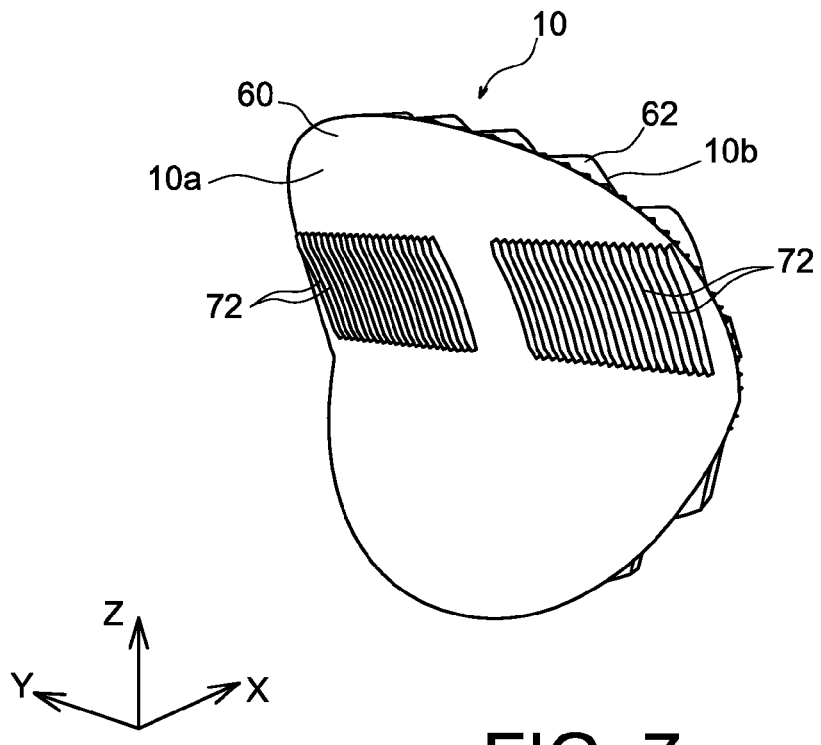
Figure 8:
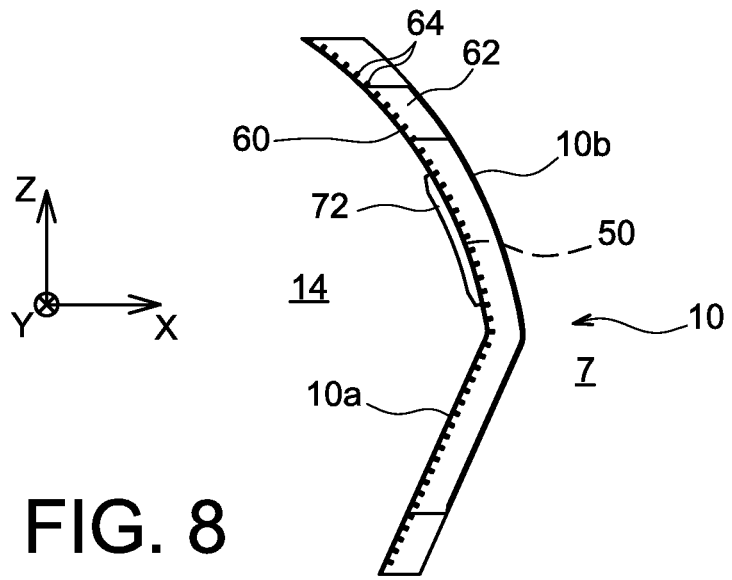
FIG. 8 is a side view of the leaktight backplate shown in FIGS. 4 to 7, showing the protrusion formed on the radome zone side by the backplate structure delimiting the recess housing the cockpit equipment.

As shown in FIGS. 7 and 8, the leaktight nose backplate 10 is also provided with additional stiffeners 72 on the first side 10a, that are mounted on the skin 60 adjacent to the part delimiting the bottom surface of each recess. These additional stiffeners 72 are preferably oriented along the direction of the height, and therefore scan a surface corresponding to the two bottom surfaces of the recesses 50. The stiffeners 72 are preferably the only stiffeners fitted on this surface of the skin 60 and form a so-called inverted mesh structure due their position on the surface of the skin opposite the surface with which the main stiffeners 62, 64 are in contact.

In this embodiment in which the additional stiffeners 72 form an integral part of the backplate structure of the recesses, only these stiffeners 72 project into the radome zone 14 as can be seen better in FIG. 7.

The elements forming part of the leaktight backplate 10 are preferably metallic or made of composite materials.

Furthermore, each recess 50 extends close to the inflection line between the top and bottom parts of the leaktight backplate, so that the rudder bar system at this location can fit. The area covered by a recess 50 may be of the order of 10 to 15% of the total area of the leaktight backplate.

Figure 9:
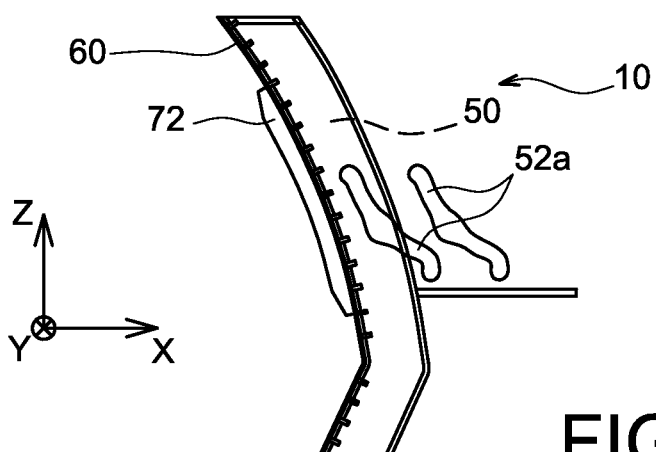
FIG. 9 shows a view similar to the view in FIG. 8, with one of the pedals of the rudder bar system shown in two extreme opposite control positions.
Figure 10:
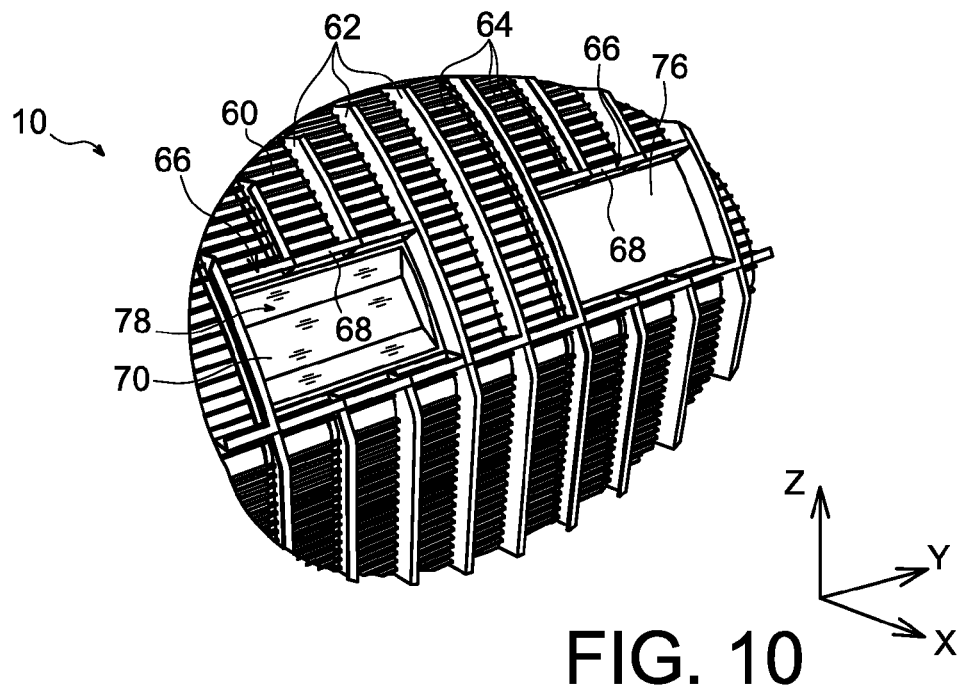
FIGS. 10 and 11 are perspective views of a leaktight backplate according to a second preferred embodiment of the invention.
Figure 11:
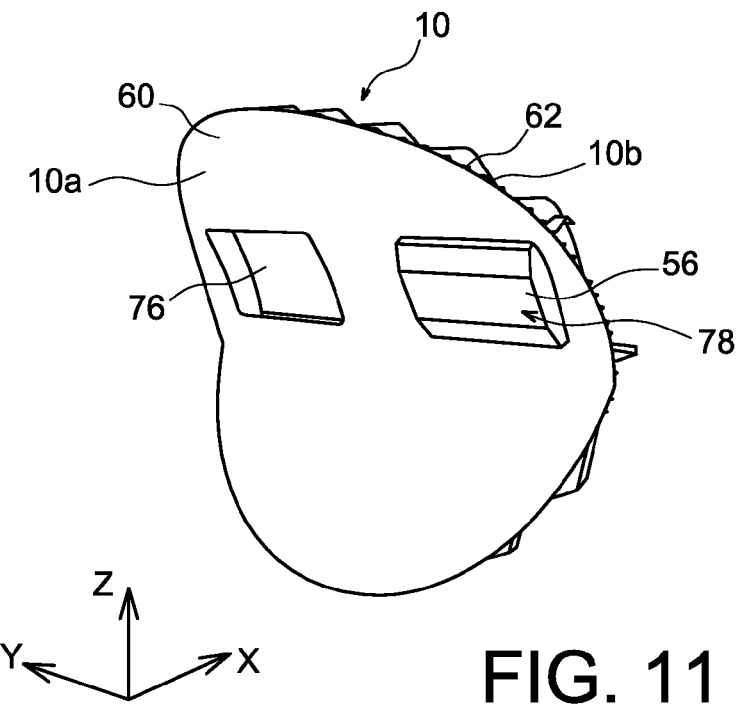
Figure 12:
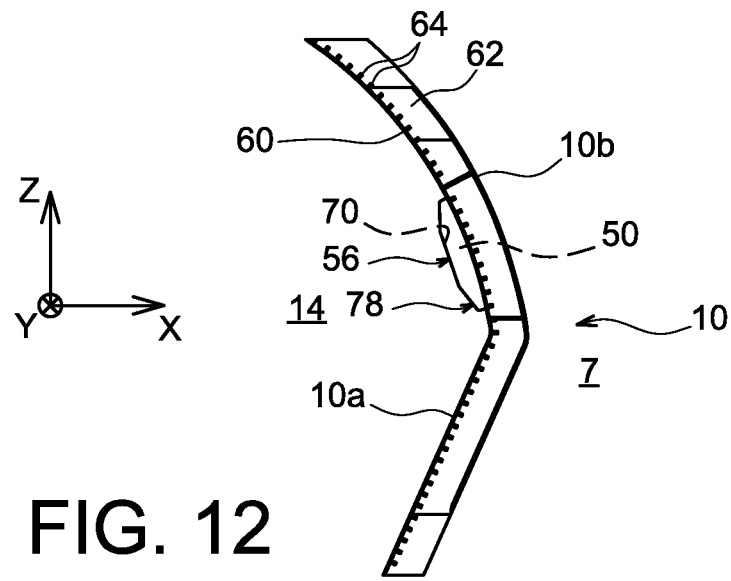
FIG. 12 is a side view of the leaktight backplate shown in FIGS. 10 and 11, showing the protrusion formed on the radome zone side by the backplate structure delimiting the recess housing the cockpit equipment.
Figure 13:
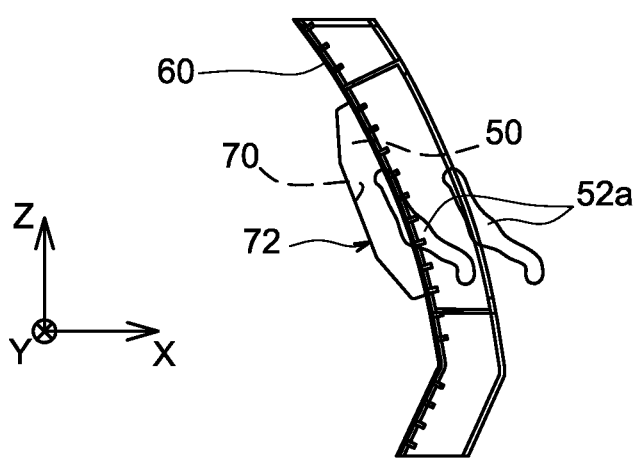
FIG. 13 shows a view similar to the view in FIG. 12, with one of the pedals of the rudder bar system shown in two extreme opposite control positions.

FIG. 9 shows one of the two pedals 52a in the rudder bar system, in two extreme opposite control positions. At least in the most forward position, the pedal 52a penetrates at least partially into its associated recess 50, for a reduction in size made possible by the local extension of the cockpit into the radome zone.

FIGS. 10 to 14 show a second preferred embodiment of the invention. This second embodiment is different from the first embodiment in that the portion of the skin delimited on the inside by the lateral structure 66 is removed so as to form a gap 76 inside this skin. The gap houses an add-on module 78 in the form of a trough, the bottom of which forms the backplate structure 56 of the recess, possibly provided with additional stiffeners. In this configuration, the backplate structure 56 defines a bottom surface 70 that is at least partially offset from the skin 60 of the leaktight backplate in the direction of the first side 10a as can be seen better in FIG. 12. The total depth of the recess 50 is therefore increased, and the space saving advantageously increased as can be seen FIG. 13 which shows one of the two pedals 52a of the rudder bar system in two extreme opposite control positions. At least in the most forward position, the pedal 52a penetrates at least partially into its associated recess 50, and may even partly project beyond the skin 60 through the gap formed in it.

The module 78 may be mounted on the leaktight backplate in several different ways. Either like a porthole with a collar around its periphery that will squeeze a seal in contact with a facing collar, for example formed on the lateral structure 66, or conventionally by bolts.

Figure 14:
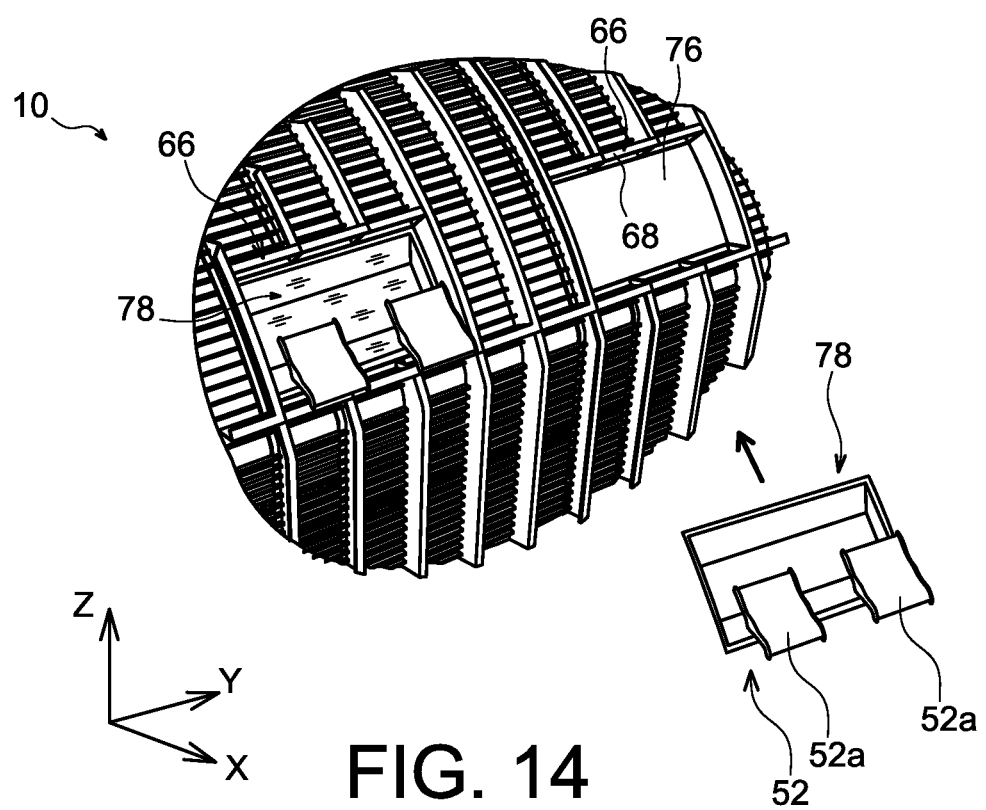
FIG. 14 diagrammatically shows a method of manufacturing a leaktight backplate shown in FIGS. 10 to 13.

One of the special features of the invention also lies in the possibility of pre-fitting the module 78 with the rudder bar system 52, and mounting the assembly in the gap as shown diagrammatically in FIG. 14. Consequently, as long as this assembly formed by the module supporting the rudder bar system is not mounted on the backplate 10, the gap 76 can be used as a manhole for operator access during manufacturing and/or during maintenance operations. Finally, simultaneous assembly of the module and the rudder bar system can reduce the manufacturing time for the aircraft nose cone.

Those skilled in the art can make many various modifications to the invention as described above, solely as non-limitative examples.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft comprising:
    a piece of cockpit equipment; and
    a nose cone backplate separating a non-pressurized radome zone from a pressurized zone, the nose cone backplate comprising:
        a first side oriented towards the radome zone in which a mobile antenna is housed; and
        a second side opposite the first side and oriented towards a cockpit of the aircraft, wherein said second side has at least one recess in which the piece of cockpit equipment is received in the pressurized zone, the recess being partly delimited by a backplate structure forming a protrusion from said first side into the radome zone wherein the aircraft nose cone backplate is leaktight.

2. The aircraft according to claim 1, wherein the backplate comprises a skin and a plurality of stiffeners fitted on said skin at the second side, and in that said recess is at least partly formed in the height of the stiffeners.

3. The aircraft according to claim 2, wherein said recess has a lateral structure from which a plurality of said stiffeners, extend, outside the recess.

4. The aircraft according to claim 1, wherein said backplate structure has additional stiffeners at said first side.

5. The aircraft according to claim 4, wherein said additional stiffeners are located on a skin of said backplate, said additional stiffeners preferably being the only stiffeners fitted on the skin at the first side.

6. The aircraft according to claim 1, wherein said backplate structure defines a bottom surface with a skin of the backplate.

7. The aircraft according to claim 1, wherein the backplate has a gap inside which a module is housed at least partly forming said backplate structure of the recess.

8. The aircraft according to claim 7, wherein said module defines a back surface at least partly offset from a skin of the backplate, and facing said first side.

9. The aircraft according to claim 7, wherein said module houses said cockpit equipment.

10. The aircraft according to claim 1, wherein said piece of cockpit equipment is one of a manual and an electronic rudder bar system.

11. The aircraft according to claim 1, wherein the backplate has two recesses facing a first and a second cockpit seat, respectively.

12. A method of manufacturing an aircraft according to claim 9, wherein at least part of said cockpit equipment is assembled on said module before said module is inserted in said gap.

* * * * *